(12) United States Patent
Zhang et al.

(10) Patent No.: US 8,015,692 B1
(45) Date of Patent: Sep. 13, 2011

(54) METHOD FOR PROVIDING A PERPENDICULAR MAGNETIC RECORDING (PMR) HEAD

(75) Inventors: Lei Larry Zhang, San Jose, CA (US); Yong Shen, Saratoga, CA (US); Honglin Zhu, Fremont, CA (US); Yizhong Wang, Woodbury, MN (US)

(73) Assignee: Western Digital (Fremont), LLC, Fremont, CA (US)

( * ) Notice: Subject to any disclaimer, the term of this patent is extended or adjusted under 35 U.S.C. 154(b) by 932 days.

(21) Appl. No.: 11/936,167

(22) Filed: Nov. 7, 2007

(51) Int. Cl.
*G11B 5/127* (2006.01)
*H04R 31/00* (2006.01)

(52) U.S. Cl. ............... 29/603.14; 29/603.13; 29/603.15; 29/603.16; 29/603.18; 216/62; 216/65; 216/66; 361/121; 361/122; 361/317; 427/127; 427/128

(58) Field of Classification Search ............... 29/603.07, 29/603.13–603.16, 603.18; 216/62, 65, 66; 360/121, 122, 317; 451/5, 41
See application file for complete search history.

(56) References Cited

U.S. PATENT DOCUMENTS

| | | | |
|---|---|---|---|
| 4,274,022 A | 6/1981 | Elsel | |
| 4,404,609 A | 9/1983 | Jones, Jr. | |
| 4,546,398 A | 10/1985 | Toda et al. | |
| 4,636,897 A | 1/1987 | Nakamura et al. | |
| 4,646,429 A | 3/1987 | Mori | |
| 4,779,463 A | 10/1988 | Woodruff | |
| 4,855,854 A | 8/1989 | Wada et al. | |
| 4,943,882 A | 7/1990 | Wada et al. | |
| 5,027,247 A | 6/1991 | Nakanishi | |
| 5,181,151 A | 1/1993 | Yamashita et al. | |
| 5,225,953 A | 7/1993 | Wada et al. | |
| 5,250,150 A | 10/1993 | Gaud | |
| 5,393,233 A | 2/1995 | Hong et al. | |
| 5,578,857 A | 11/1996 | Hong et al. | |
| 5,953,591 A | 9/1999 | Ishihara et al. | |
| 6,211,090 B1 | 4/2001 | Durlam et al. | |
| 6,218,080 B1 | 4/2001 | Wu et al. | |
| 6,261,918 B1 | 7/2001 | So | |
| 6,292,329 B1 | 9/2001 | Sato et al. | |
| 6,315,839 B1 | 11/2001 | Pinarbasi et al. | |
| 6,353,995 B1 | 3/2002 | Sasaki et al. | |
| 6,417,561 B1 | 7/2002 | Tuttle | |
| 6,433,970 B1 | 8/2002 | Knapp et al. | |
| 6,475,062 B1 | 11/2002 | Kubota et al. | |
| 6,501,619 B1 | 12/2002 | Sherrer et al. | |
| 6,504,675 B1 | 1/2003 | Shukh et al. | |
| 6,513,228 B1 | 2/2003 | Khizroev et al. | |
| 6,514,393 B1 | 2/2003 | Contolini et al. | |
| 6,515,824 B1 | 2/2003 | Sato | |
| 6,522,007 B2 | 2/2003 | Kouno et al. | |
| 6,524,491 B1 | 2/2003 | Liu et al. | |

(Continued)

OTHER PUBLICATIONS

Tomohiro Okada, et al., "Fabrication Process for a Trapezoidal Main Pole for Single-Pole-Type Heads", IEEE Transactions on Magnetics, vol. 38, Issue 5, pp. 2249-2252, Sep. 2002.

(Continued)

*Primary Examiner* — Paul D Kim

(57) ABSTRACT

A method for providing a perpendicular magnetic recording head includes providing a metal underlayer and forming a trench in the metal underlayer. The trench has a bottom and a top wider than the bottom. The method also includes providing a PMR pole. At least a portion of the PMR pole resides in the trench. The method also includes providing a write gap on the PMR pole and providing a top shield on at least the write gap.

9 Claims, 15 Drawing Sheets

U.S. PATENT DOCUMENTS

| | | | |
|---|---|---|---|
| 6,540,928 B1 | 4/2003 | Kobrin et al. |
| 6,587,314 B1 | 7/2003 | Lille |
| 6,680,829 B2 | 1/2004 | Chen et al. |
| 6,687,083 B2 | 2/2004 | Hsiao et al. |
| 6,707,083 B1 | 3/2004 | Hiner et al. |
| 6,709,322 B2 | 3/2004 | Saldana et al. |
| 6,741,422 B2 | 5/2004 | Hsiao et al. |
| 6,743,642 B2 | 6/2004 | Costrini et al. |
| 6,751,054 B2 | 6/2004 | Sato et al. |
| 6,757,141 B2 | 6/2004 | Santini et al. |
| 6,776,917 B2 | 8/2004 | Hsiao et al. |
| 6,807,027 B2 | 10/2004 | McGeehin et al. |
| 6,808,442 B1 | 10/2004 | Wei et al. |
| 6,833,979 B1 | 12/2004 | Knapp et al. |
| 6,836,957 B2 | 1/2005 | Kobayashi |
| 6,843,707 B2 | 1/2005 | Saldana et al. |
| 6,876,518 B2 | 4/2005 | Khizroev et al. |
| 6,876,519 B1 | 4/2005 | Litvinov et al. |
| 6,943,993 B2 | 9/2005 | Chang et al. |
| 6,949,833 B2 | 9/2005 | O'Kane et al. |
| 6,952,867 B2 | 10/2005 | Sato |
| 6,954,340 B2 | 10/2005 | Shukh et al. |
| 6,975,486 B2 | 12/2005 | Chen et al. |
| 6,980,403 B2 | 12/2005 | Hasegawa |
| 7,042,682 B2 | 5/2006 | Hu et al. |
| 7,070,698 B2 | 7/2006 | Le |
| 7,193,815 B1 | 3/2007 | Stoev et al. |
| 7,508,627 B1 * | 3/2009 | Zhang et al. | 360/125.12 |
| 2001/0008501 A1 | 7/2001 | Sekine |
| 2001/0035357 A1 | 11/2001 | Sasaki |
| 2002/0006013 A1 | 1/2002 | Sato et al. |
| 2002/0012195 A1 | 1/2002 | Lahiri et al. |
| 2002/0012196 A1 | 1/2002 | Obara |
| 2002/0151254 A1 | 10/2002 | Saldana et al. |
| 2002/0181162 A1 | 12/2002 | Chen et al. |
| 2002/0190382 A1 | 12/2002 | Kouno et al. |
| 2002/0191336 A1 | 12/2002 | Hsiao et al. |
| 2003/0039064 A1 | 2/2003 | Khizroev et al. |
| 2003/0071263 A1 | 4/2003 | Kouno et al. |
| 2003/0117749 A1 | 6/2003 | Shukh et al. |
| 2004/0001283 A1 | 1/2004 | Fontana et al. |
| 2004/0008446 A1 | 1/2004 | Schmidt |
| 2004/0008451 A1 | 1/2004 | Zou et al. |
| 2004/0032692 A1 | 2/2004 | Kobayashi |
| 2004/0102138 A1 | 5/2004 | Saldana et al. |
| 2004/0150912 A1 | 8/2004 | Kawato et al. |
| 2004/0161576 A1 | 8/2004 | Yoshimura |
| 2004/0252415 A1 | 12/2004 | Shukh et al. |
| 2005/0011064 A1 | 1/2005 | Lee |
| 2005/0024779 A1 | 2/2005 | Le et al. |
| 2005/0068669 A1 | 3/2005 | Hsu et al. |
| 2005/0068671 A1 | 3/2005 | Hsu et al. |
| 2006/0002020 A1 | 1/2006 | Pokhil et al. |
| 2006/0044681 A1 | 3/2006 | Le et al. |
| 2006/0044682 A1 | 3/2006 | Le et al. |
| 2006/0082924 A1 | 4/2006 | Etoh et al. |
| 2006/0198049 A1 | 9/2006 | Sasaki et al. |
| 2007/0035878 A1 | 2/2007 | Guthrie et al. |
| 2007/0035885 A1 | 2/2007 | Im et al. |

OTHER PUBLICATIONS

Tomohiro Okada, et al., "Fabricating Narrow and Trapezoidal Main Poles for Single-Pole-Type Heads", IEEE Transactions on Magnetics, vol. 40, Issue 4, pp. 2329-2331, Jul. 2004.

* cited by examiner

METHOD FOR PROVIDING A PERPENDICULAR MAGNETIC RECORDING (PMR) HEAD

BACKGROUND

Conventional perpendicular magnetic recording (PMR) heads may be unshielded or shielded. Although easier to fabricate and having higher write fields, unshielded heads have a low gradient field. Such a low gradient field results in less sharp transitions and lower signal to noise ratios, which are undesirable. Consequently, shielding is typically provided in conventional PMR heads.

FIG. 1 depicts a portion of a conventional PMR transducer 10, as viewed from the air-bearing surface (ABS). The conventional PMR transducer 10 is a shielded transducer. The conventional PMR transducer 10 is typically part of a merged head including the PMR transducer 10 and a read transducer (not shown) and typically resides on a slider (not shown). For clarity, the conventional PMR transducer 10 is not drawn to scale.

The conventional PMR transducer 10 includes a conventional first pole 12, alumina insulating layer 14, alumina underlayer 16 that may be considered part of the alumina insulating layer 14, a conventional PMR pole 18 that typically includes a seed layer (not shown), insulating layer 20, shield gap 26, and top shield 28. Note that in certain other embodiments, the top shield 28 may also act as pole during writing using the conventional PMR transducer 10. The conventional PMR pole 18 is surrounded by insulating layer 20. Similarly, the top shield 28 is surrounded by another insulating layer (not shown). The conventional PMR pole 18 has sidewalls 22 and 24. In conventional applications, the height of the conventional PMR pole 18 is typically less than approximately three-tenths micrometer. The conventional PMR pole 18 also has a negative angle such that the top of the conventional PMR pole 18 is wider than the bottom of the conventional PMR pole 18. Stated differently, the angle θ of the sidewalls is less than ninety degrees in the conventional PMR pole 18 of FIG. 1. A pole having this height and shape is desirable for use in PMR applications.

FIG. 2 is a flow chart depicting a conventional method 50 for fabricating the conventional PMR transducer 10. The conventional method 50 is a damascene process. For simplicity, some steps are omitted. For clarity, the conventional method 50 is described in the context of the conventional PMR transducer 10. The conventional method 50 starts during formation of the insulating layer 20, via step 52. Typically, the insulating layer is an alumina layer. The insulating layer 20 is etched to form a trench therein, via step 54. The insulating layer is etched using an alumina reactive ion etch (RIE). The trench formed has sidewalls having a negative angle. Thus, the top of the trench is wider than the bottom of the trench. The conventional PMR pole 18 is provided, via step 56. Step 56 typically includes plating material for the conventional PMR pole 18 and performing a planarization. The shield gap 26 is deposited, via step 58. The top shield 28 is provided, via step 60. Thus, the conventional PMR transducer 10 may be fabricated.

Although the conventional method 50 can provide the conventional PMR transducer 10 using a damascene process, the conventional method 50 has drawbacks. The conventional PMR transducer 10 utilizes only a top shield 28. Use of the top shield 28 improves the gradient field. In addition, the net magnetic field from the conventional PMR transducer 10 is at an angle to the perpendicular direction. However, performance of the conventional PMR transducer 10 may still suffer due to stray side fields. Such stray side fields may cause side erasure of adjacent tracks. In addition, such a wider field profile may give rise to increased magnetic track width. Consequently, the reduced track pitch required for ultrahigh density recording may not be achieved. In addition, the method 50 utilizes an alumina RIE in step 54. Typically, this step requires the utilization of a different, expensive tool to complete. Consequently, fabrication of the conventional PMR transducer 10 is made more complex.

FIG. 3 depicts a portion of a conventional PMR transducer 10', as viewed from the ABS. For clarity, the conventional PMR transducer 10' is not drawn to scale. Portions of the conventional PMR transducer 10' are analogous to the conventional PMR transducer 10. Consequently, such components are labeled similarly. Thus, the conventional PMR transducer 10' includes a conventional first pole 12', alumina insulating layer 14', alumina underlayer 16' that may be considered part of the alumina insulating layer 14', a conventional PMR pole 18' that typically includes a seed layer (not shown), shield gap 26', and shield 28'. The shield 28' includes top shield 28A and side shield 28B portions. Similarly, the shield gap 26' includes top gap 26A and side gap 26B portions.

Like the conventional PMR transducer 10, the conventional PMR transducer 10' is a shielded transducer. However, the conventional PMR transducer 10' has a wraparound shield 28 including both a top portion 28A and side shields 28B.

FIG. 4 is a flow chart depicting a conventional method 70 for fabricating the conventional PMR head 10' having a wraparound shield 28'. For simplicity, some steps are omitted. The conventional method 70 is described in the context of the conventional PMR head 10'. The conventional method 70 starts during formation of the PMR pole 18'. The PMR pole 18' is defined, via step 72. The shield gap 26' is deposited, via step 74. Thus, both the top gap 26A and the side gap 26B are deposited in step 74. A photoresist mask (not shown) for the shield 28' is provided, via step 76. The shield 28' is plated, via step 78. The photoresist mask used for the shield 28' is then removed, via step 80. Fabrication of the PMR head 10' is then completed, via step 82. Thus, the PMR head 10' may be formed.

Thus, the conventional PMR transducer 10' includes side shields 28B. In contrast to the conventional PMR transducer 10, the method 70 used in fabricating the conventional PMR transducer 10' does not use a damascene process. Thus, the conventional PMR transducer 10' is not formed by forming a trench in an insulator and providing the PMR pole 18' in the trench. Instead, the shield gap 26' is deposited around an already-formed conventional PMR pole 18' in step 74 and the shield plated in step 78.

Although the conventional method 70 may be used to fabricate the conventional PMR head 10', there are significant drawbacks. In particular, the conventional method 70 for fabricating the conventional PMR transducer may be difficult to extend to the conventional PMR pole 18' having a top width of less than one hundred nanometers. Consequently, the conventional PMR transducer 10' formed using the method 70 may not be manufacturable at higher densities.

Accordingly, what is needed is an improved method for fabricating a PMR transducer.

SUMMARY

A method and system for providing a perpendicular magnetic recording head are disclosed. The method and system include providing a metal underlayer and forming a trench in the metal underlayer. The trench has a bottom and a top wider than the bottom. The method and system also include providing a PMR pole. At least a portion of the PMR pole resides in the trench. The method and system also include providing a write gap on the PMR pole and providing a top shield on at least the write gap.

DETAILED DESCRIPTION OF THE PREFERRED EMBODIMENTS

Figure 1:
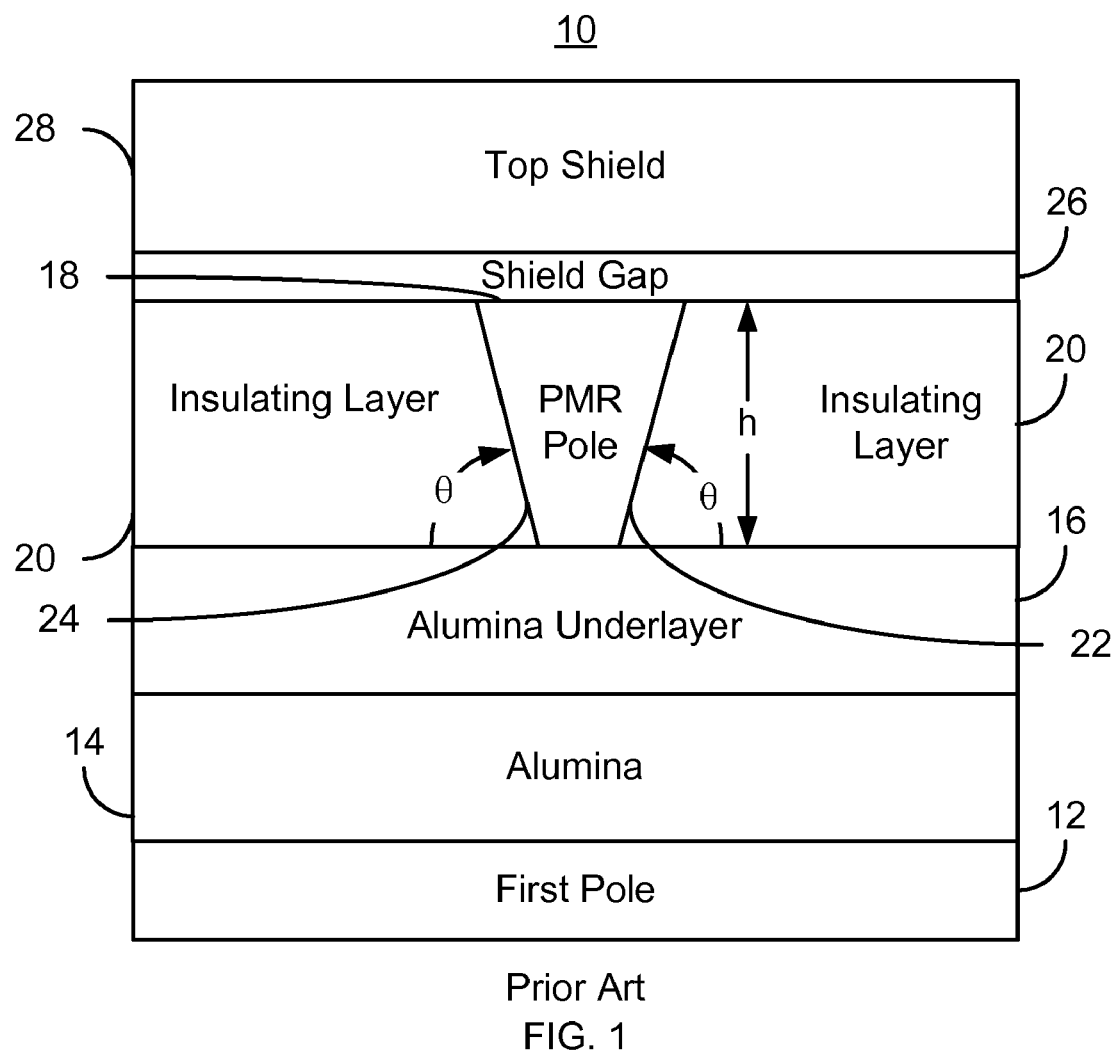
FIG. 1 is diagram depicting a conventional PMR head.
Figure 2:
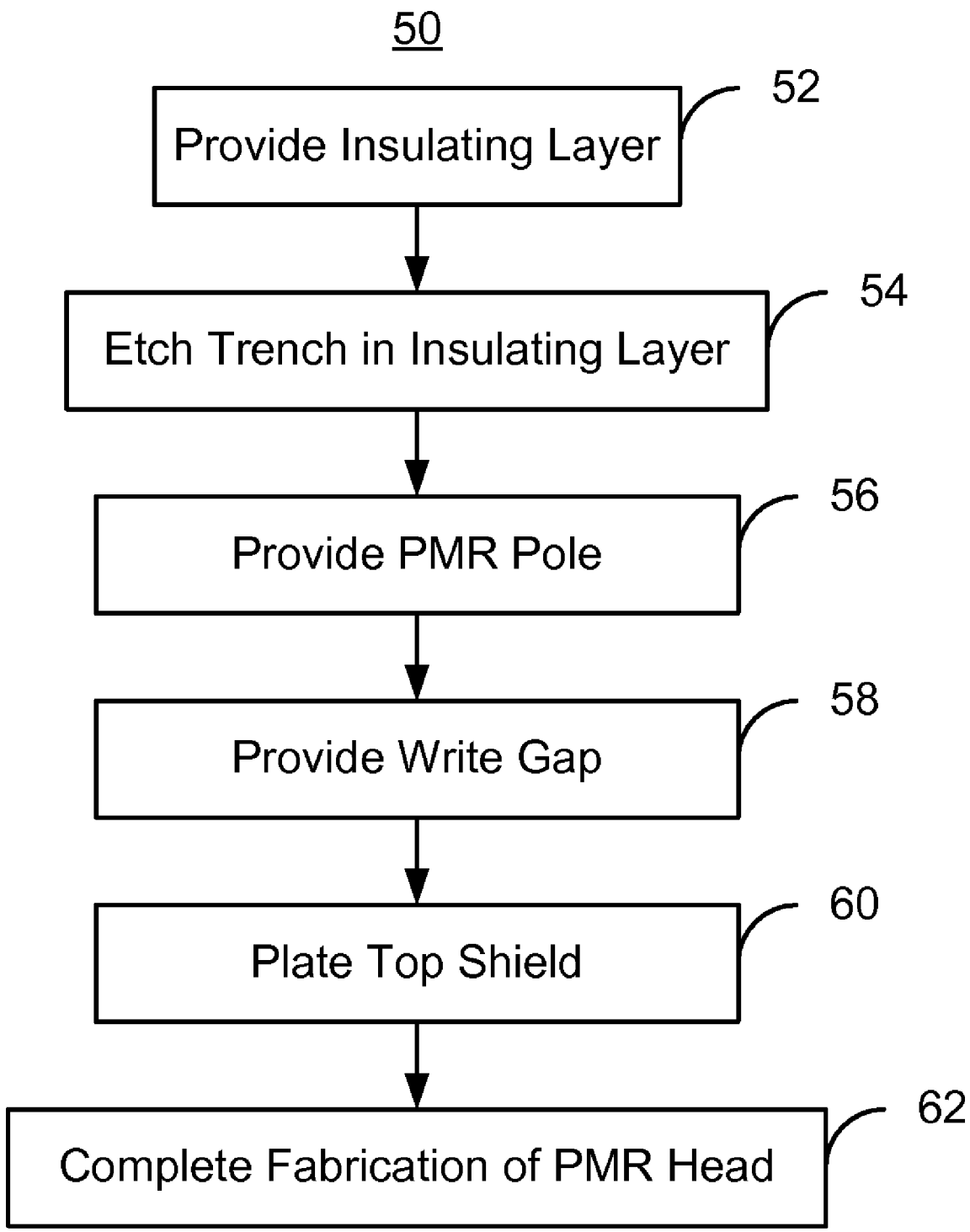
FIG. 2 is a flow chart depicting a conventional method for fabricating a PMR head using a conventional damascene process
Figure 3:
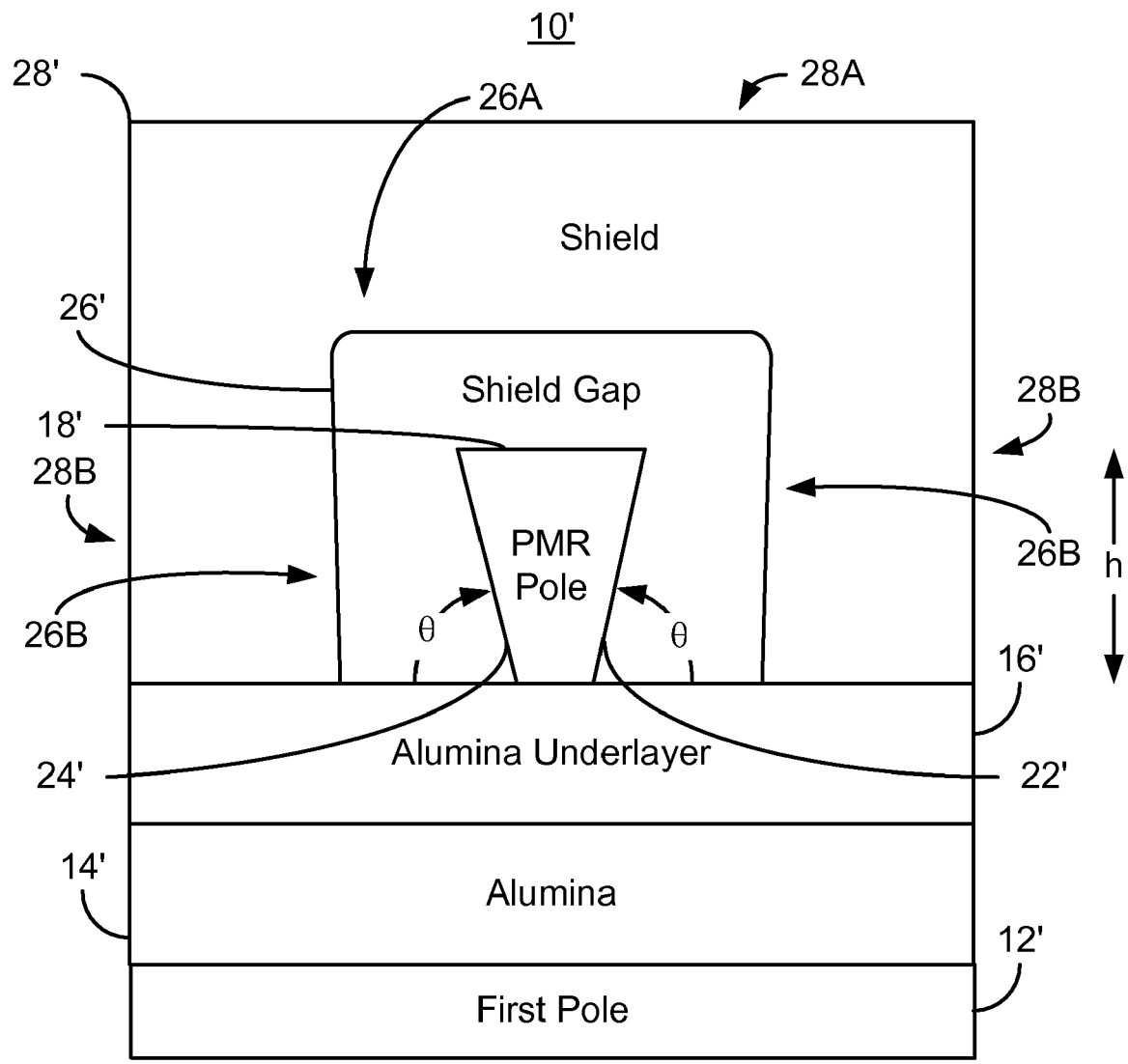
FIG. 3 is diagram depicting another conventional PMR head having side shields
Figure 4:
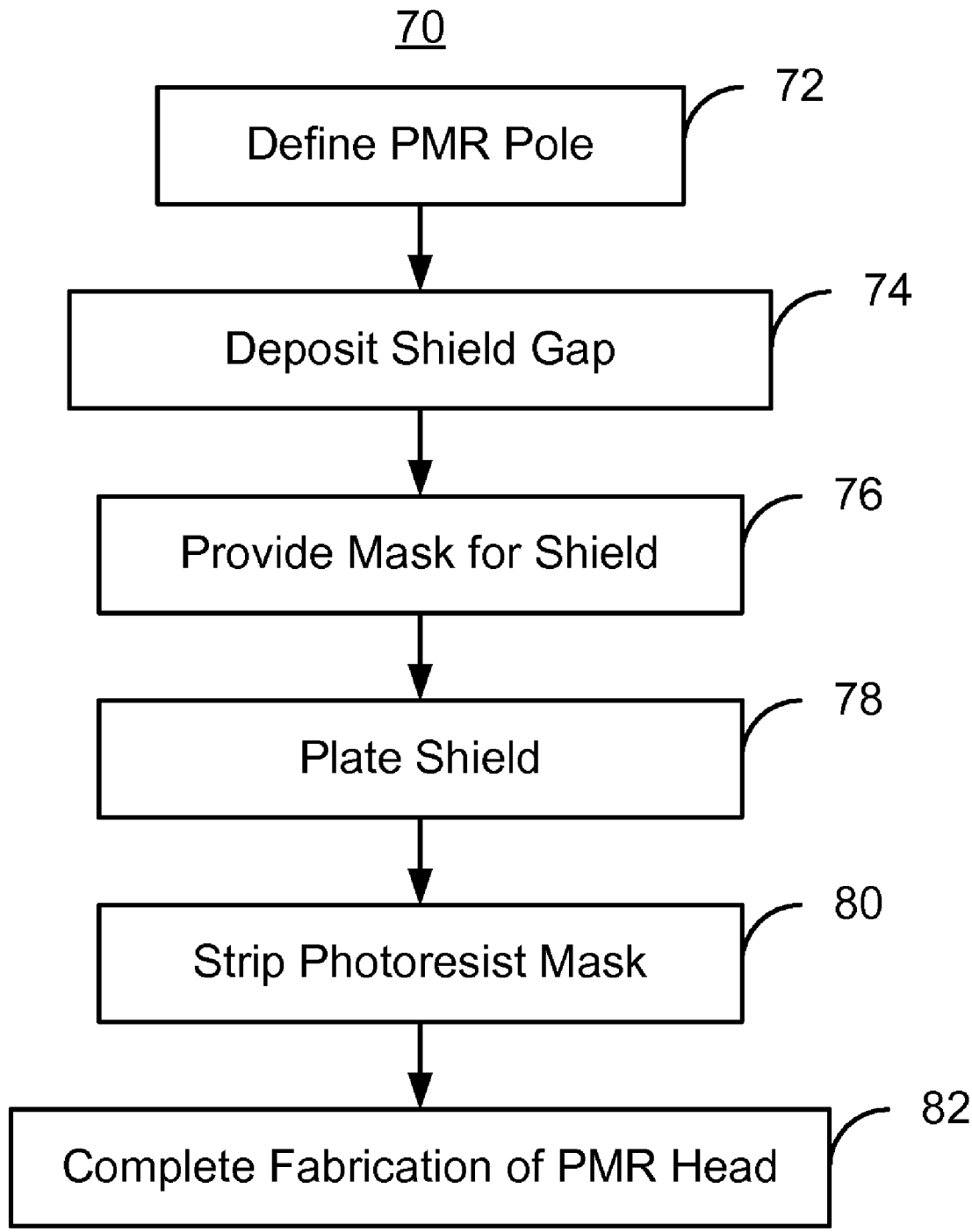
FIG. 4 is a flow chart depicting a conventional method for fabricating a PMR head having side shields.
Figure 5:
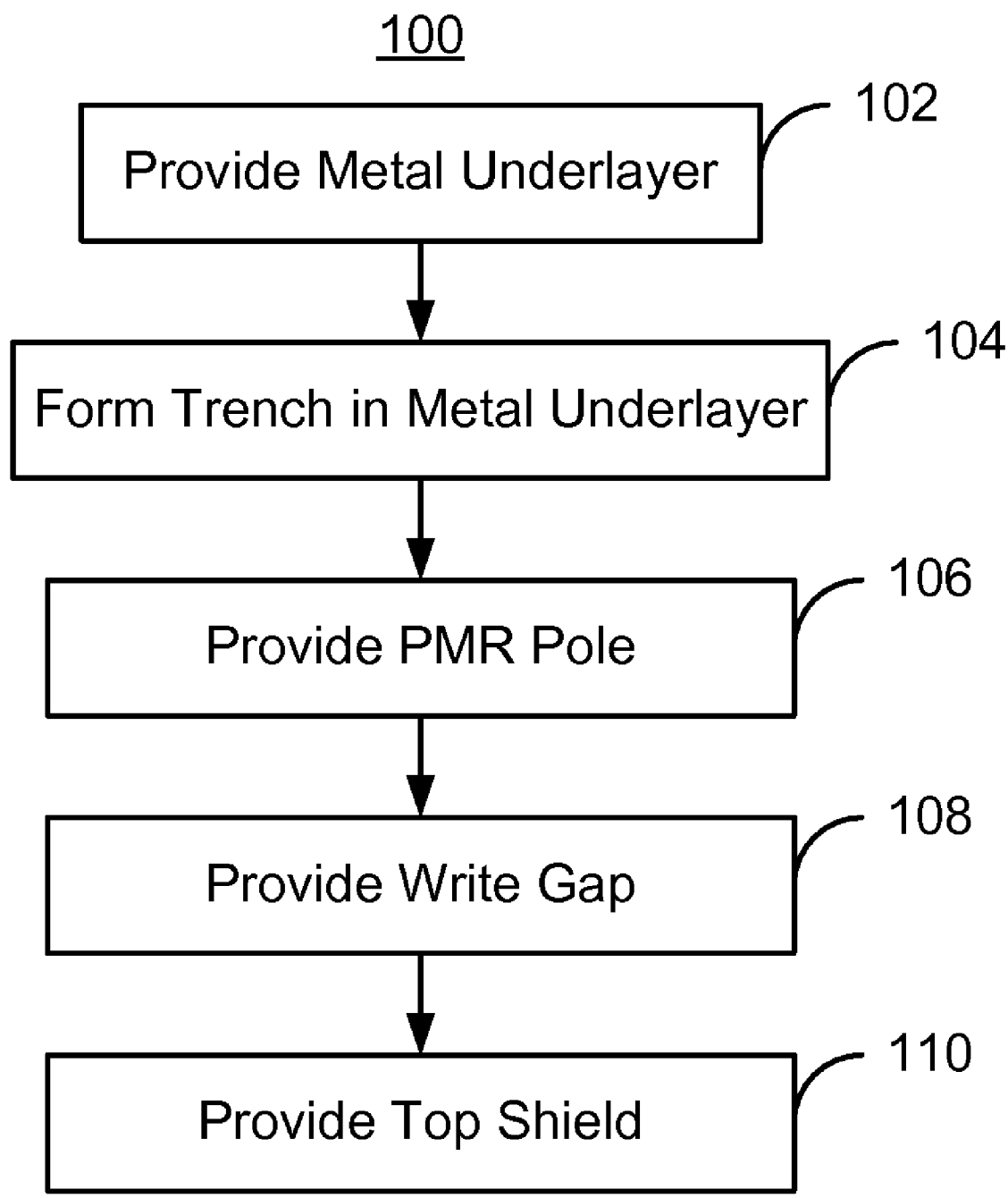
FIG. 5 is a flow chart depicting one embodiment of a method for fabricating a PMR transducer.

FIG. 5 is a flow chart depicting one embodiment of a method 100 fabricating a PMR transducer. For simplicity, some steps may be omitted. The PMR transducer being fabricated may be part of a merged head that also includes a read head (not shown) and resides on a slider (not shown). The method 100 also may commence after formation of a first pole and formation of layers that will reside under a second pole. The method 100 is also described in the context of providing a single PMR transducer. However, the method 100 may be used to fabricate multiple transducers at substantially the same time.

A metal underlayer for the PMR pole is provided, via step 102. The metal underlayer may be provided on a base layer. The base layer may be an insulator, such as alumina. However, in another embodiment, another base layer having other characteristics may be utilized. In one embodiment, the metal underlayer may be magnetic. For example, magnetic metals that may be used may include at least one of NiFe and NiCoFe with varying compositions. In another embodiment, the metal underlayer may be nonmagnetic. For example, nonmagnetic metals used for the metal underlayer may include at least one of NiCr, NiNb, and Ta. In one embodiment, step 102 includes providing a chemical mechanical planarization (CMP) stop layer, for example including at least one of Ru and Ta. In one embodiment, the thickness of the metal layer is at least 0.05 micrometer and not more than 0.4 micrometer. In another embodiment, the metal underlayer is at least 0.1 micrometer and not more than 0.3 micrometers. The thickness of the metal underlayer provided may depend upon the thickness of the PMR pole to be fabricated.

A trench is provided in the metal underlayer, via step 104. In step 104, the trench may be formed using processes which remove metal. For example, a metal RIE and/or ion beam etch may be utilized in step 104. Step 104 also may include providing a photoresist mask covering portions of the metal underlayer and an aperture over the region in which the trench is formed. The trench has a reverse angle desired for the PMR pole. Thus, the top of the trench is wider than the bottom of the trench. In one embodiment, the trench extends through the metal underlayer to the base layer.

A PMR pole is formed, via step 106. At least a portion of the PMR pole resides in the trench. In one embodiment, step 106 may include depositing the material(s) for the PMR pole and performing a planarization step, such as a CMP. A write gap is provided on the PMR pole, via step 108. A top shield may be provided, via step 110. The top shield may be formed by plating the shield. In addition, a seed layer may be provided. Fabrication of the PMR transducer may then be completed.

Using the method 100, a PMR pole may be provided using a damascene process. Thus, the top width of the PMR pole provided in step 106 may be small. In one embodiment, the top width may be one hundred nanometers or smaller. The method 100, therefore, may be extensible to higher density PMR transducers. Moreover, because the metal underlayer is used, an RIE for an insulating layer may be avoided. Consequently, fabrication may be simplified and improved. Furthermore, if the metal underlayer provided in step 102 is magnetic, the metal underlayer may function as a side shield. The PMR transducer provided may thus have a wraparound shield. Consequently, stray fields to the sides and top of the PMR pole may be reduced. Performance of the PMR transducer may, therefore, be improved.

Figure 6:
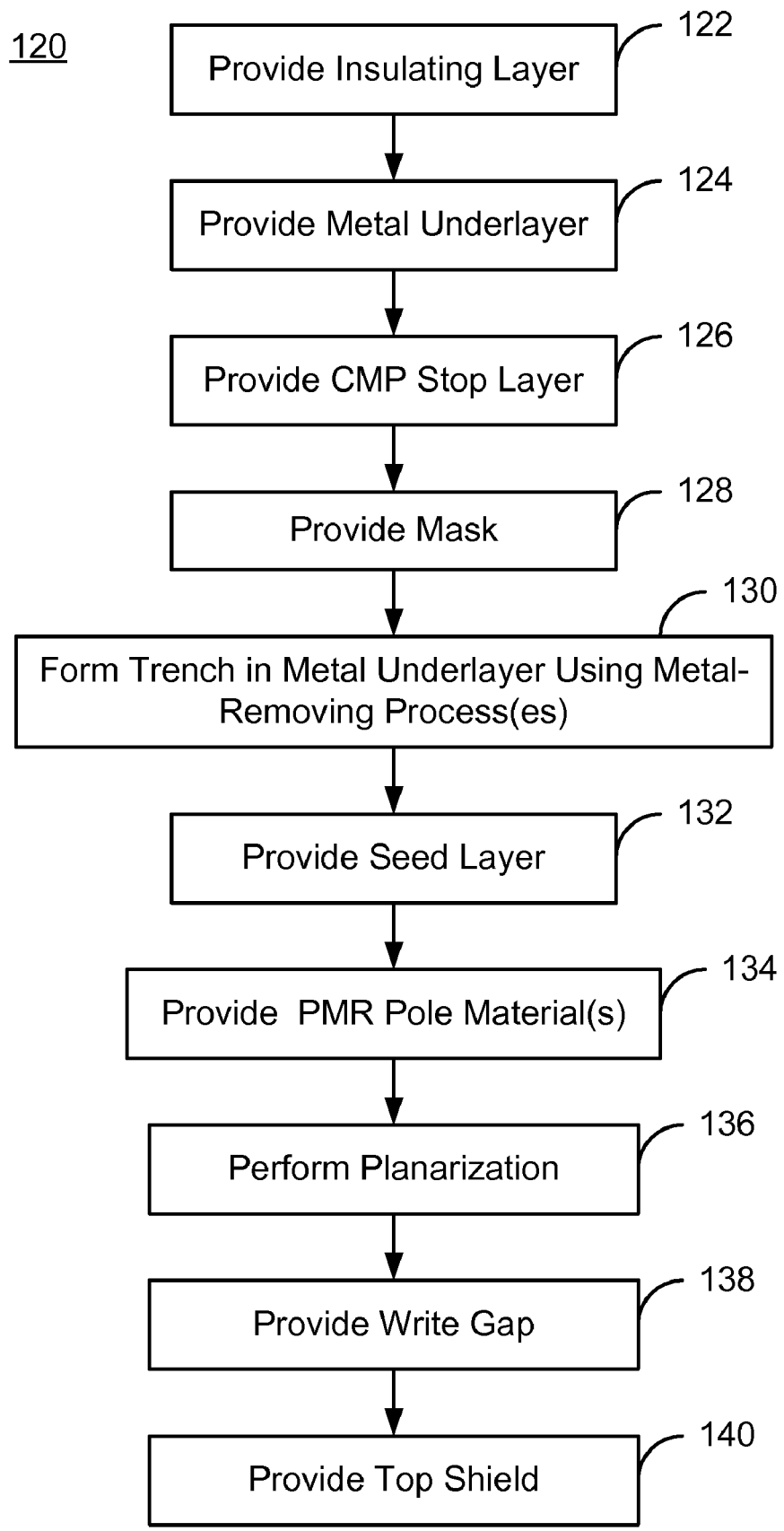
FIG. 6 is a flow chart depicting another embodiment of a method for fabricating a PMR head.

FIG. 6 is a flow chart depicting another embodiment of a method 120 for fabricating a PMR head. For simplicity, some steps may be omitted. FIGS. 7-15 are diagrams depicting the ABS views of an exemplary embodiment of a PMR head 150 during fabrication. For clarity, FIGS. 7-15 are not drawn to scale. The method 120 is described in connection with the PMR head. The PMR head 150 being fabricated includes a read transducer 152, a write transducer, or PMR transducer 160, and resides on a slider (not shown). The method 120 also may commence after formation of the read transducer 152, a first pole 162 of and other layers that will reside under the PMR pole. The method 120 is also described in the context of a single PMR head and a single PMR pole. However, the method 100 may be used to fabricate multiple transducers and/or poles at substantially the same time.

A base layer is provided, via step 122. The base layer provided may be an insulating layer, such as alumina. However, in another embodiment, another base layer having other characteristics may be provided in step 122. For example, in another embodiment, a metal layer that may act as a step layer for the processes used to provide the trench in step 130, described below. For example, in one such embodiment, a Ru layer may be used.

Figure 7:
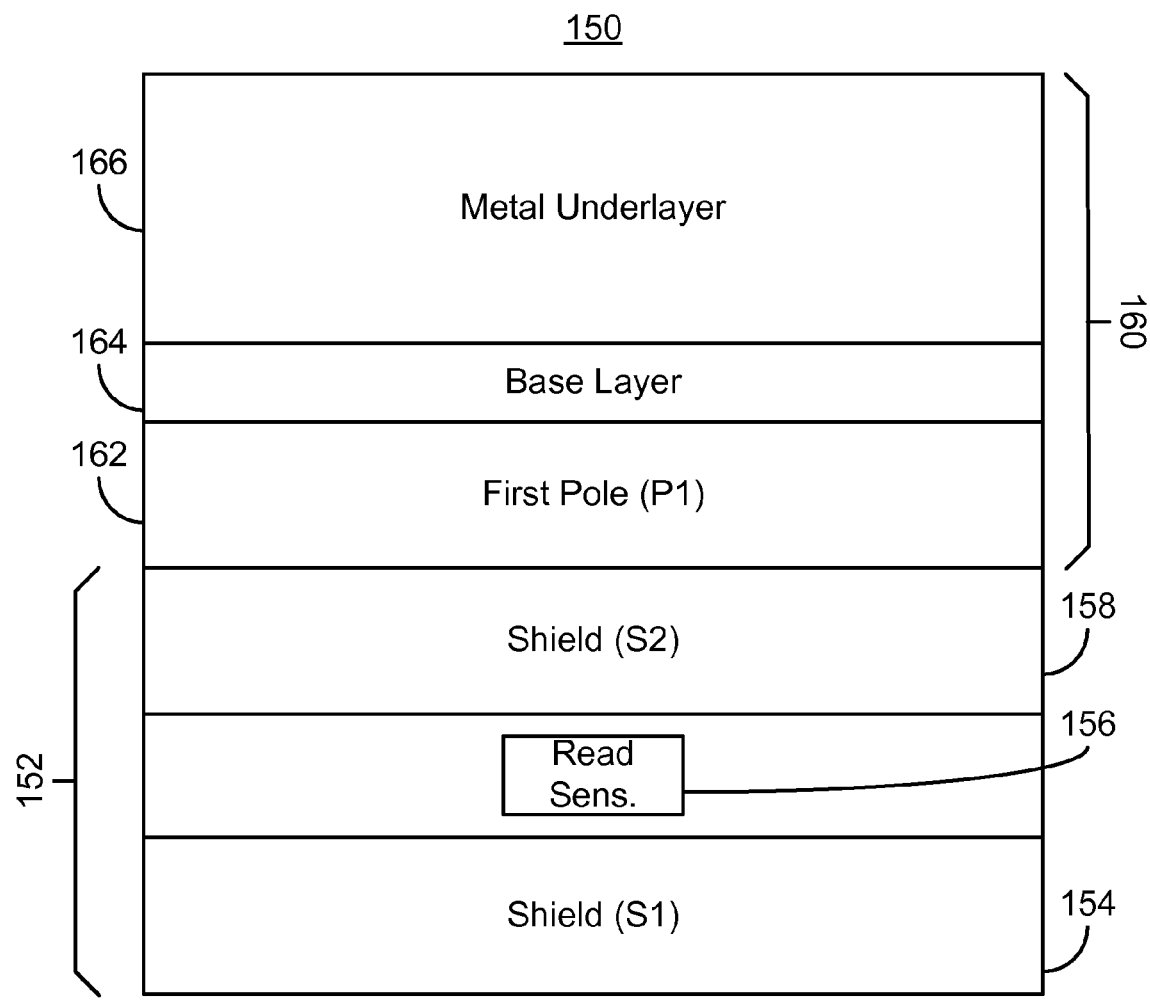
FIGS. 7-15 are diagrams depicting the ABS views of an exemplary embodiment of a perpendicular magnetic recording head during fabrication.

A metal underlayer is provided on the insulating layer, via step 124. In one embodiment, the metal underlayer provided in step 124 may magnetic. For example, magnetic metals that may be used may include at least one of NiFe and NiCoFe with varying compositions. If a magnetic metal is used in step 124, the PMR head may include side shielding. Thus, the PMR head 150 may include a wraparound shield. In another embodiment, the metal underlayer may be nonmagnetic. For example, nonmagnetic metals used for the metal underlayer may include at least one of NiCr, NiNb, and Ta. FIG. 7 depicts the PMR head 150 after step 124 is performed. The PMR head 150 includes a read transducer 152 having a first shield 154, a read sensor 156, and a second shield 158. In one embodiment, the read sensor 156 may be a magnetoresistive read sensor. However, in another embodiment, another sensor may be used. The PMR head 150 also includes the PMR transducer 160, which may include a first pole 162. The insulating base layer 164 and metal underlayer 166 are also shown. In one embodiment, the thickness of the metal underlayer 166 is at least 0.05 micrometer and not more than 0.4 micrometer. In another embodiment, the metal underlayer 166 is at least 0.1 micrometer and not more than 0.3 micrometers. The thickness of the metal underlayer 166 provided may depend upon the desired thickness of the PMR pole to be fabricated. In one embodiment, the thickness of the metal underlayer 166 is at least as large as, or larger than, the thickness of the PMR pole to be fabricated.

Figure 8:
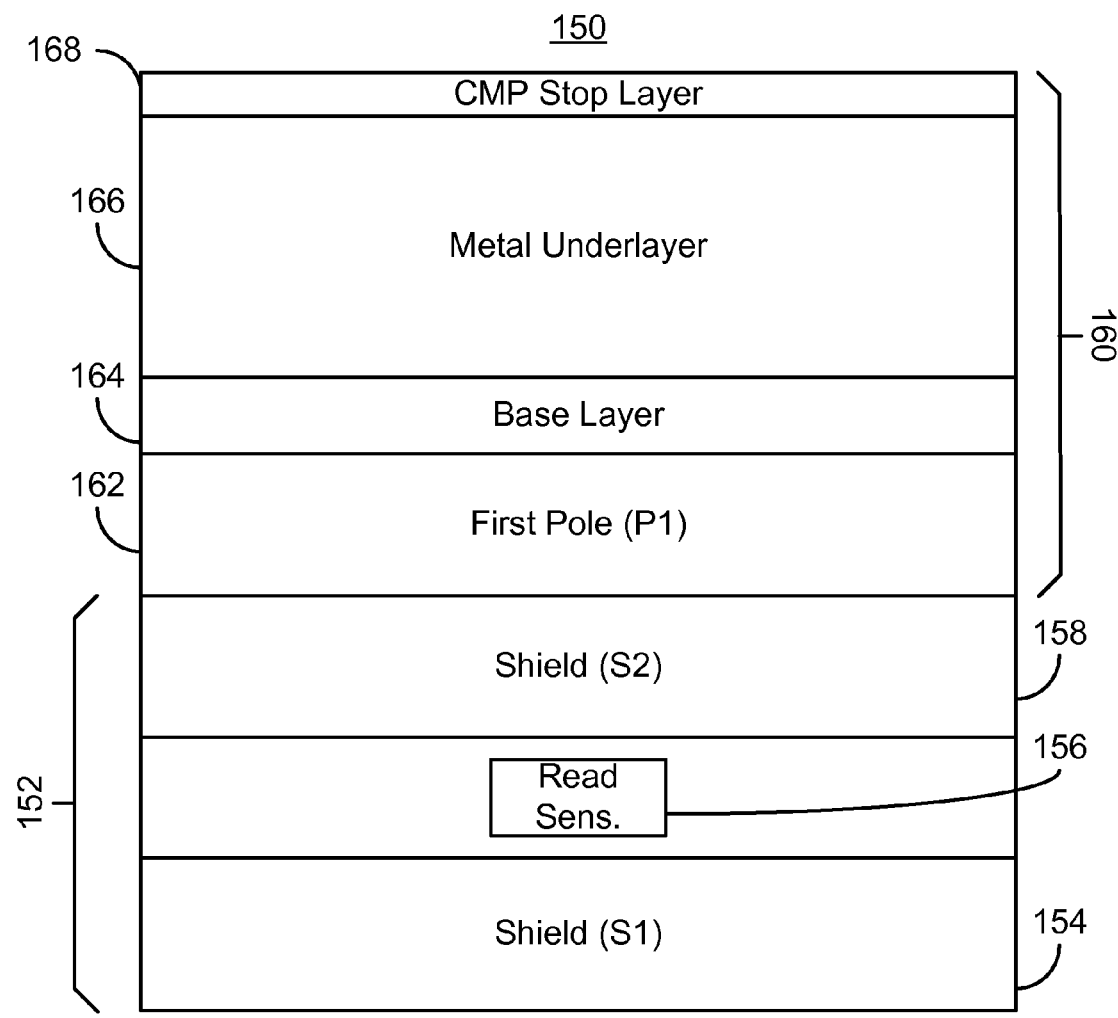

A CMP stop layer is provided on the metal underlayer 166, via step 126. The CMP stop layer may also be a metal layer. Thus, step 126 may include providing a layer of material(s) including at least one of Ru and Ta. FIG. 8 depicts the PMR head 150 after step 126 is performed. Consequently, a CMP stop layer 168 on the metal underlayer 166 is shown.

Figure 9:
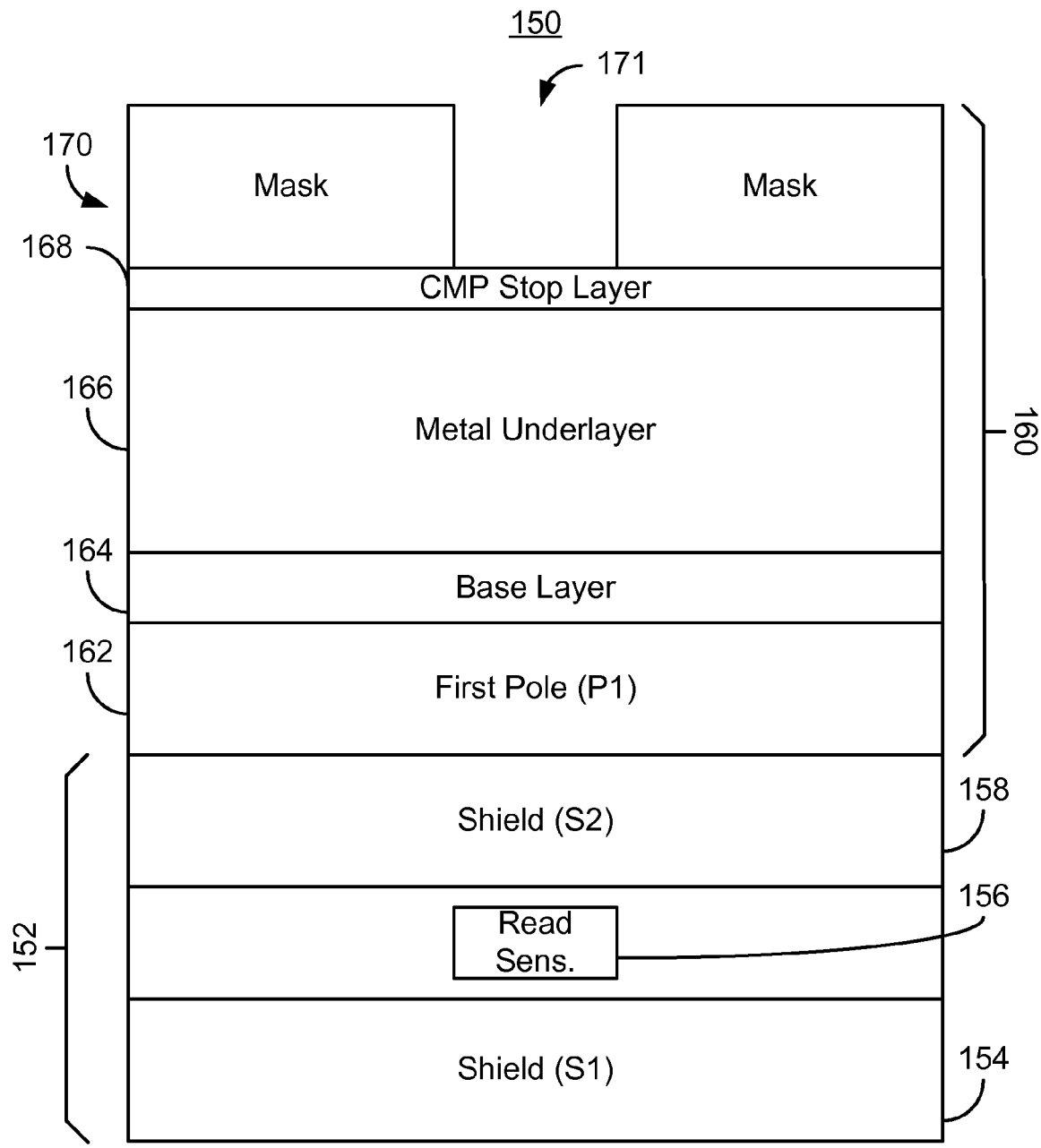

A mask is provided on the metal underlayer 166, via step 128. In one embodiment, the mask is a photoresist mask. FIG. 9 depicts the PMR head 150 after step 128 is performed. Thus, a photoresist mask 170 including an aperture 171 is shown. The aperture 171 exposes the region of the metal underlayer 166 in which a trench is to be formed.

Figure 10:
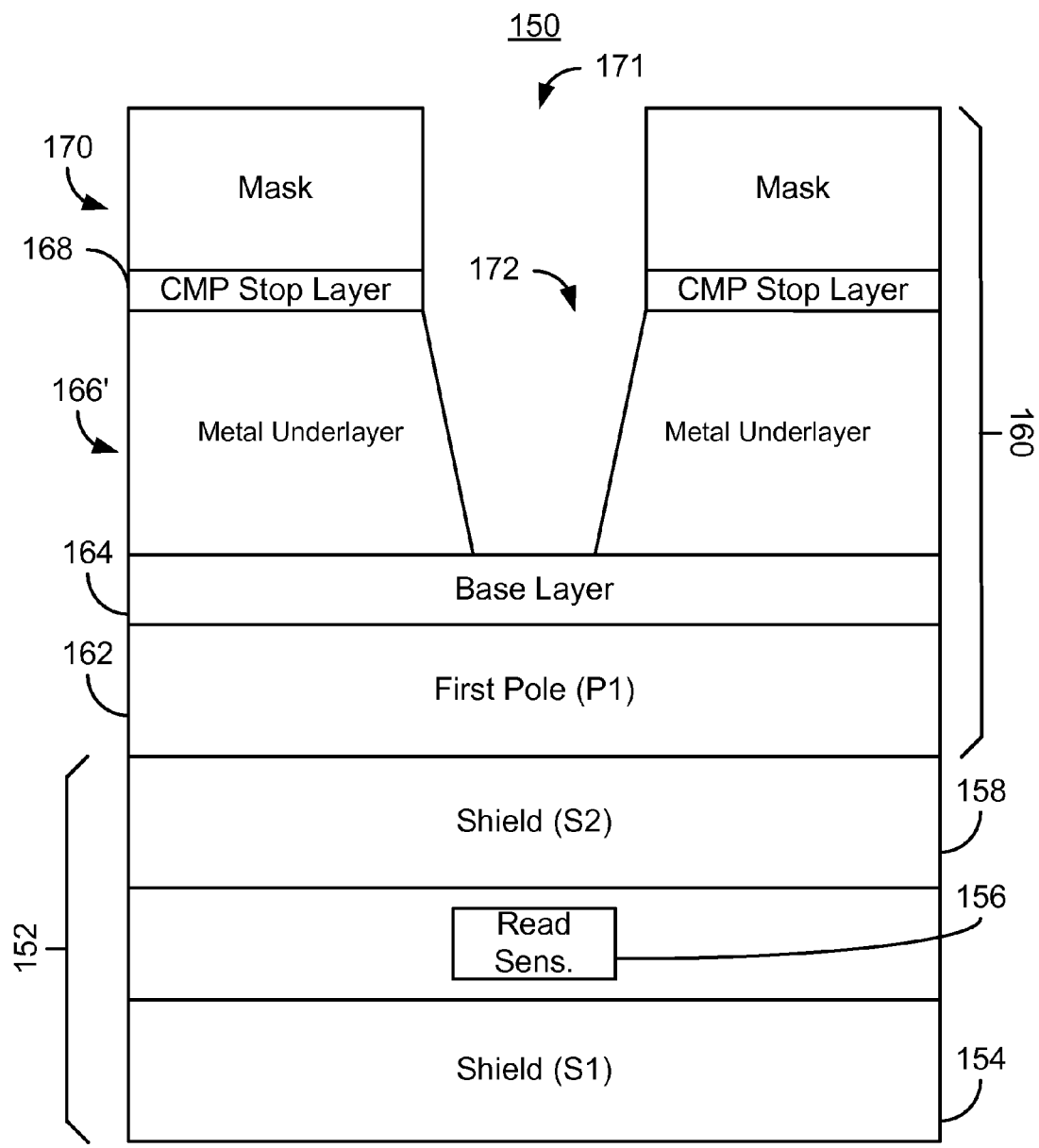

A trench is provided in the metal underlayer using process(es) which remove metal, via step 130. In one embodiment, step 130 includes performing a metal RIE and/or ion beam etch. FIG. 10 depicts the PMR head 150 after step 130 is performed. Thus, a trench 172 has been formed in the metal underlayer 166'. The trench 172 has a reverse angle desired for the PMR pole. Thus, the top of the trench 172 is wider than the bottom of the trench. In one embodiment, the trench 172 extends through the metal underlayer 166' to the insulating layer 164. However, in another embodiment, the trench 172 may not extend through the metal underlayer 166'.

Figure 11:
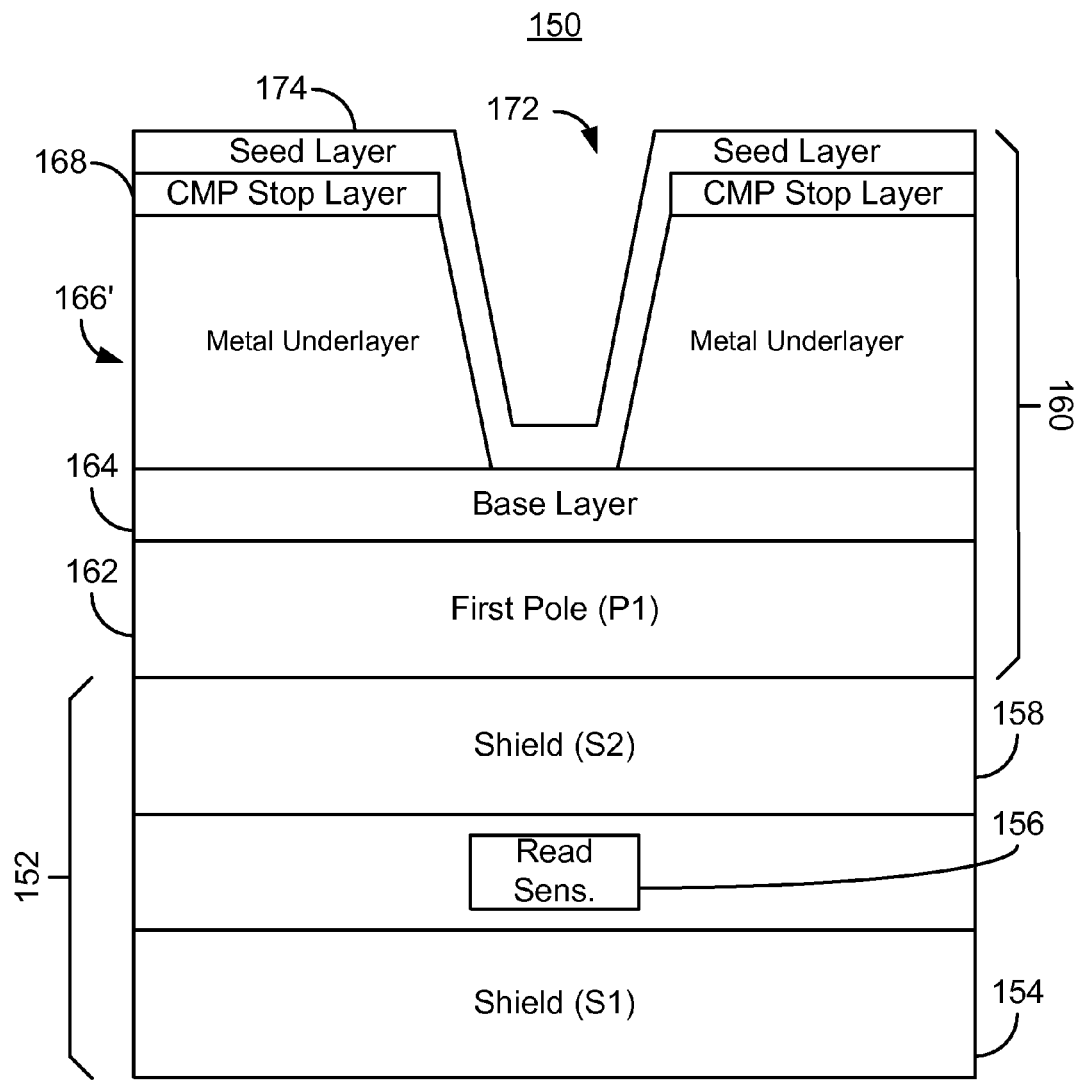
Figure 12:
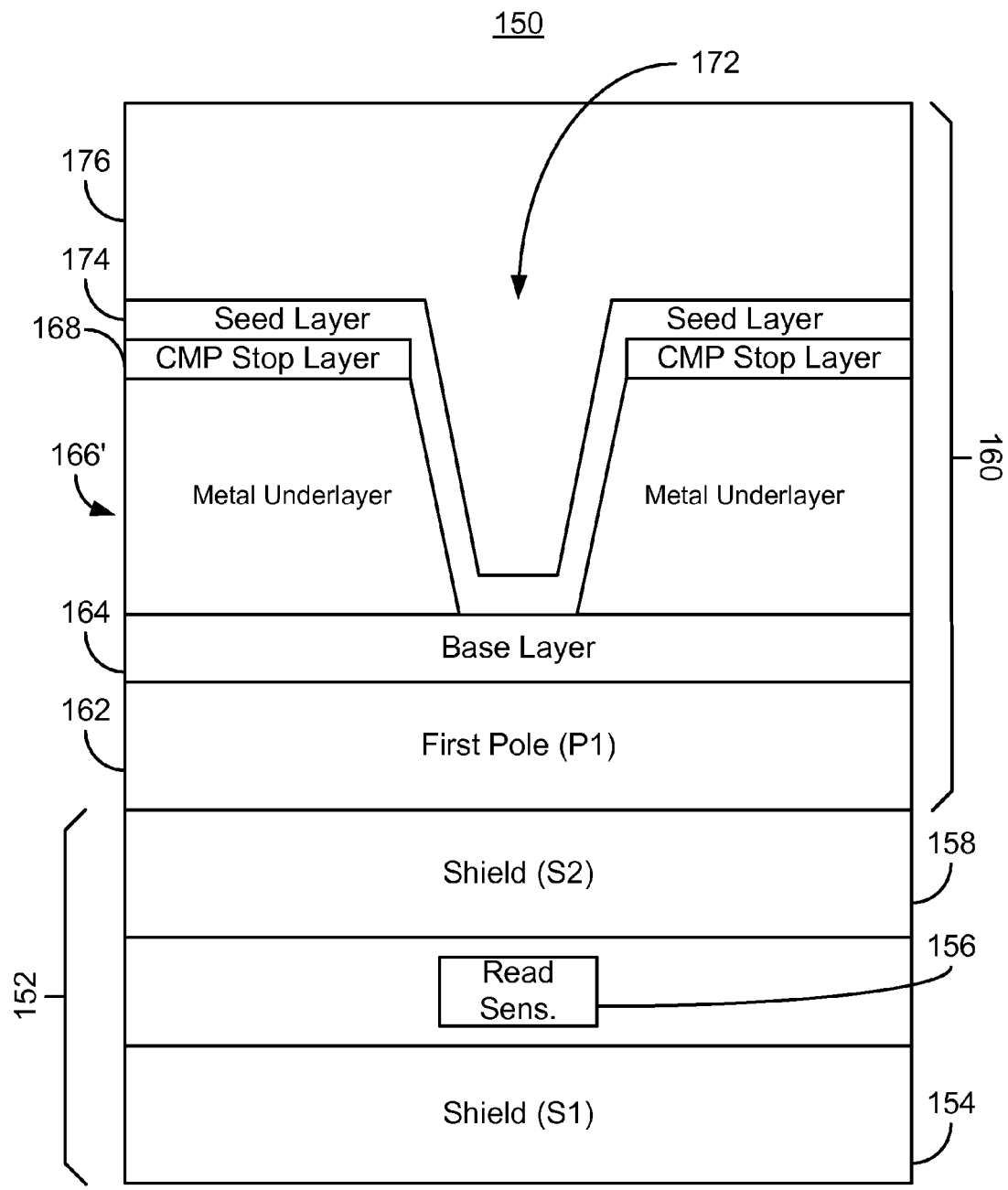
Figure 13:
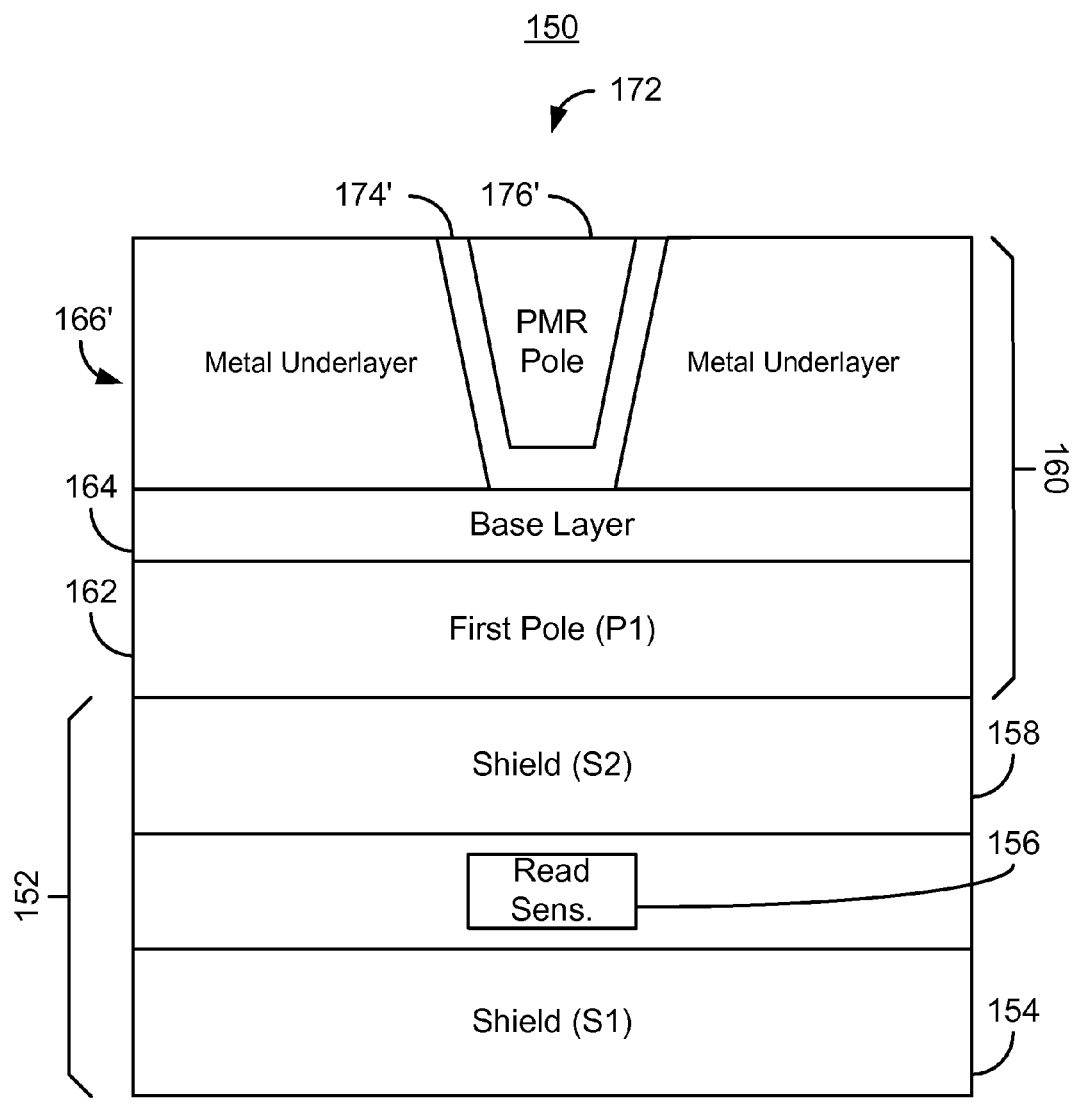

In steps 132-136, a PMR pole, at least a portion of which pole resides in the trench 172, is formed. Thus, a seed layer is provided, via step 132. Step 132 may include depositing one or more material(s) such as NiNb, NiCr, and Au. FIG. 11 depicts the PMR head 150 after step 132 is performed. Thus, the seed layer 174 is shown. In one embodiment, the seed layer 174 is blanket deposited. Consequently, a portion of the seed layer 174 is in the trench 172 and another portion of the seed layer 174 resides outside of the trench 172. The material(s) for the PMR pole are provided, via step 134. In one embodiment, step 134 includes plating the material(s). FIG. 12 depicts the PMR head 150 after step 134 is performed. Thus, the pole material(s) 176 are shown. The pole material(s) fill the trench 172 and, in one embodiment, extend across at least a portion of the PMR head 150. A planarization is performed, via step 136. In one embodiment, step 136 includes performing a CMP. In addition, a light ion mill may be performed in step 136. FIG. 13 depicts the PMR head 150 after step 136 is performed. In the embodiment shown, the entire CMP stop layer 168 is removed in the planarization and subsequent optional ion mill. However, in another embodiment, some of the CMP stop layer 168 may remain. In addition, the portion of the pole materials 176 outside of the trench 172 has been removed. Similarly, the portion of the seed layer 174 outside of the trench 172 has been removed. Consequently, the PMR pole 176' and portion of the seed layer 174' remain.

Figure 14:
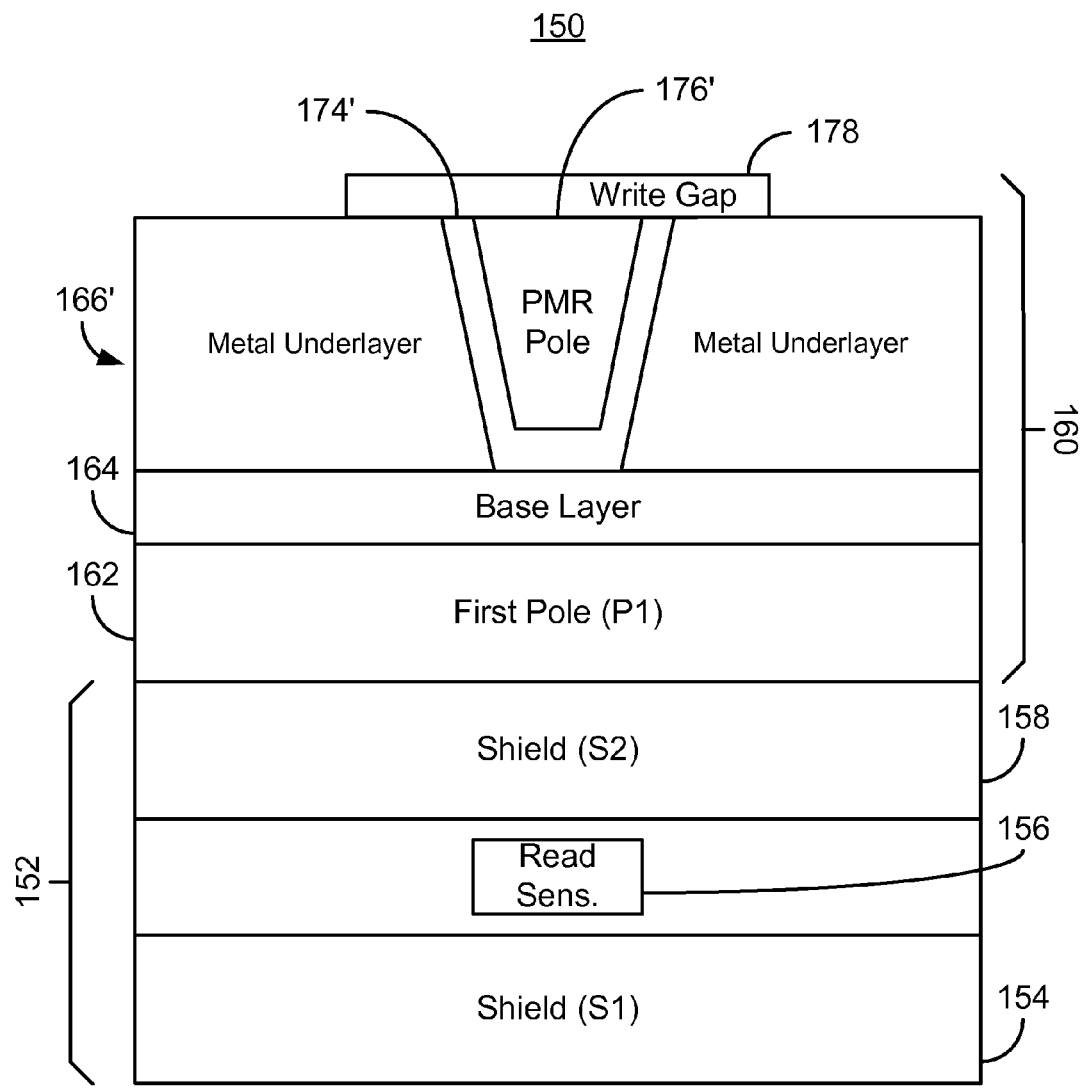
Figure 15:
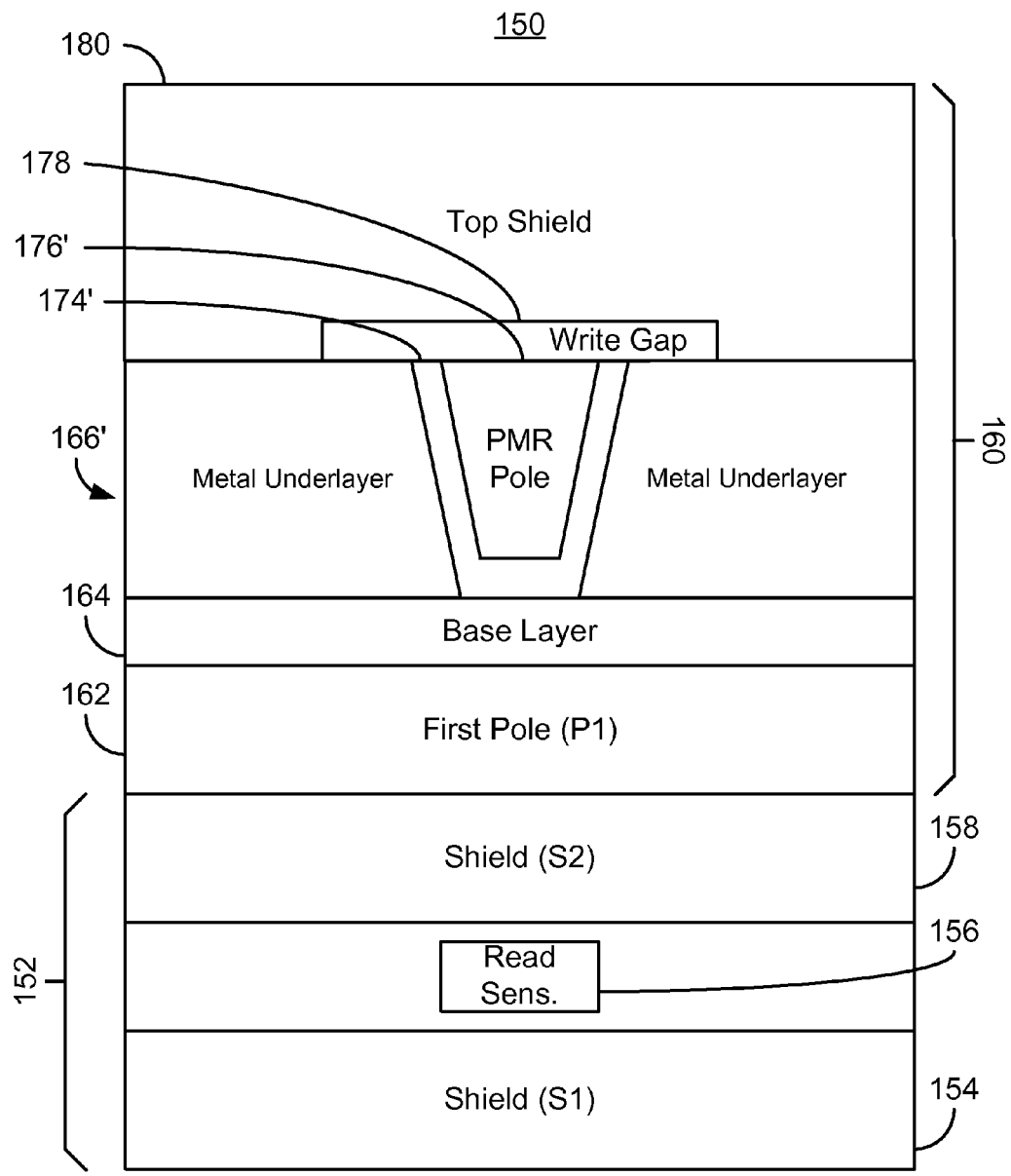

A write gap is provided on the PMR pole, via step 138. In one embodiment, step 138 includes depositing the material(s) for the write gap, then utilizing photolithography to pattern the gap. FIG. 14 depicts the PMR head 150 after step 138 is performed. Consequently, a write gap 178 has been provided. A top shield may be provided, via step 140. The top shield may be formed by plating the shield. Step 140 may also include providing a seed layer for the top shield may. FIG. 15 depicts the PMR head 150 after step 140 has been performed. Thus, a top shield 180 is depicted. Fabrication of the PMR head 150 may then be completed.

Using the method 120, the PMR pole 176' may be provided using a damascene process. Thus, the top width of the PMR pole 176' provided in steps 132-136 may be small. In one embodiment, the top width may be one hundred nanometers or smaller. The method 120, therefore, may be extensible to higher density PMR heads. Moreover, because the metal underlayer 166' is used, an RIE for an insulating layer may be avoided. Instead, processes which remove the metal may be used in step 130. Consequently, fabrication may be simplified and improved. Furthermore, if the metal underlayer 166' is magnetic, the metal underlayer 166' may function as a side shield. The PMR transducer provided may thus have a wrap-around shield including the magnetic metal underlayer 166' and top shield 180. Consequently, performance of the PMR head 150 may be improved.

We claim:

1. A method for providing a perpendicular magnetic recording (PMR) head comprising:
   providing a metal underlayer;
   forming a trench in the metal underlayer, the trench having a bottom and a top wider than the bottom, the step of forming the trench further including providing a chemical mechanical planarization (CMP) stop layer on the metal underlayer;
   providing a PMR pole, at least a portion of the PMR pole residing in the trench;
   providing a write gap on the PMR pole; and
   providing a top shield on at least the write gap.

2. The method of claim 1 wherein the CMP stop layer includes at least one of Ru and Ta.

3. The method of claim 1 wherein the providing the metal underlayer further includes:
   providing a nonmagnetic metal underlayer.

4. The method of claim 1 further comprising:
   providing an insulating base layer under the metal underlayer and wherein the trench extends through the metal underlayer, such that the bottom of the PMR pole contacts a portion of the insulating base layer.

5. The method of claim 1 further comprising:
   providing a metal base layer under the metal underlayer and wherein the trench extends through the metal underlayer, such that the bottom of the PMR pole contacts a portion of the metal base layer.

6. A method for providing a perpendicular magnetic recording (PMR) head comprising:
   providing a metal underlayer;
   forming a trench in the metal underlayer, the trench having a bottom and a top wider than the bottom;
   providing a PMR pole, at least a portion of the PMR pole residing in the trench;
   providing a write gap on the PMR pole; and
   providing a top shield on at least the write gap;
   wherein the step of providing the PMR pole further includes
   providing a seed layer;
   depositing at least one magnetic pole layer; and
   removing a portion of the at least one magnetic pole layer, a remaining portion of the at least one magnetic pole layer forming the PMR pole.

7. The method of claim 6 wherein the step of providing the seed layer further includes:
   depositing at least one of NiNb, NiCr, Au, and Ru.

8. A method for providing a perpendicular magnetic recording (PMR) head comprising:
   providing a metal underlayer, wherein the providing the metal underlayer further includes providing a magnetic metal underlayer;

forming a trench in the metal underlayer, the trench having a bottom and a top wider than the bottom;

providing a PMR pole, at least a portion of the PMR pole residing in the trench;

providing a write gap on the PMR pole providing a top shield on at least the write gap.

9. A method for providing a perpendicular magnetic recording (PMR) head comprising:

providing an insulating base layer;

providing a metal underlayer on the insulating base layer, the metal underlayer being a magnetic metal underlayer;

providing a mask on the metal underlayer, the mask having an aperture therein;

performing at least one of a metal reactive ion etch and an ion beam etch to remove a portion of the metal underlayer exposed by the aperture, thereby forming a trench in the metal underlayer, the trench having a bottom and a top wider than the bottom and extending through the metal underlayer;

providing a PMR pole, at least a portion of the PMR pole residing in the trench;

providing a write gap on the PMR pole; and providing a top shield on at least the write gap.

* * * * *